(12) United States Patent
Sih et al.

(10) Patent No.: US 6,557,022 B1
(45) Date of Patent: Apr. 29, 2003

(54) DIGITAL SIGNAL PROCESSOR WITH COUPLED MULTIPLY-ACCUMULATE UNITS

(75) Inventors: Gilbert C. Sih, San Diego, CA (US); Xufeng Chen, San Diego, CA (US); De D. Hsu, San Diego, CA (US)

(73) Assignee: Qualcomm, Incorporated, San Diego, CA (US)

( * ) Notice: Subject to any disclaimer, the term of this patent is extended or adjusted under 35 U.S.C. 154(b) by 0 days.

(21) Appl. No.: 09/513,980

(22) Filed: Feb. 26, 2000

(51) Int. Cl.[7] .............................. G06F 7/38; G06F 7/00
(52) U.S. Cl. ....................... 708/523; 708/603
(58) Field of Search ................. 708/490, 523, 708/520, 524, 501, 603

(56) References Cited

U.S. PATENT DOCUMENTS

| 4,771,379 A | * | 9/1988 | Ando et al. ............... 712/42 |
| 4,996,661 A | * | 2/1991 | Cox et al. ................ 708/508 |
| 5,483,352 A | | 1/1996 | Fukuyama et al. |
| 5,764,943 A | * | 6/1998 | Wechsler ................ 712/218 |
| 5,933,797 A | | 8/1999 | Haakansson et al. |
| 5,941,940 A | * | 8/1999 | Prasad et al. ............ 708/523 |
| 5,966,652 A | | 10/1999 | Coad et al. |
| 5,991,785 A | * | 11/1999 | Alidina et al. ........... 708/207 |

FOREIGN PATENT DOCUMENTS

| EP | 0458563 | 11/1991 |
| WO | 8301415 | 4/1983 |
| WO | 9856159 | 12/1998 |
| WO | 0122680 | 3/2001 |
| WO | 0154380 | 7/2001 |

OTHER PUBLICATIONS

Fujioka, et al., "240MOPS Reconfigurable Parallel VLSI Processor for Robot Control", IEEE, Sep. 11, 1992, pp. 1385–1390.

* cited by examiner

*Primary Examiner*—Chuong Dinh Ngo
(74) *Attorney, Agent, or Firm*—Philip R. Wadsworth; Charles D. Brown; Howard H. Seo

(57) ABSTRACT

Two multiply-accumulate units are coupled together so that the computation (B*C)+(D*E) can be completed in one cycle. An adder (216) adds together the products of the two multipliers (206), (208). The sum is applied to the first accumulator (220). Preferably, the second product is also applied to the second accumulator (222), and a multiplexer (218) applies either a zero or the second product to the adder (216). If two unrelated computations are to be executed simultaneously, then the zero is applied, and the output of the second accumulator is fed back to the register file (PI2). If a single (B*C)+(D*E) computation is to be executed, then the second product is applied to the adder, and the output of the second accumulator is disregarded.

1 Claim, 5 Drawing Sheets

DIGITAL SIGNAL PROCESSOR WITH COUPLED MULTIPLY-ACCUMULATE UNITS

BACKGROUND OF THE INVENTION

1. Technical Field

This invention relates to digital signal processors, and has particular relation to multiply-accumulate (MAC) units.

2. Background Art

Digital Signal Processors (DSPs) are specialized types of microprocessors that are specifically tailored to execute mathematical computations very rapidly. DSPs can be found in a variety of applications including compact disk players, PC disk drives, telecommunication modem banks, and cellular telephones.

In the cellular telephone context, the demand for DSP computation capability continues to grow, driven by the increasing needs of applications such as GPS position location, voice recognition, low-bit rate speech and audio coding, image and video processing, and 3G cellular modem processing. To meet these processing demands, there is a need for improved digital signal processor architectures that can process computations more efficiently.

Considerable work has been done in these areas. Applicant Sih is also an applicant in the following applications for U.S. patents:

"Multiple Bus Architecture in a Digital Signal Processor", Ser. No. 09/044,087, filed Mar. 18, 1998, now abandoned;

"Digital Signal Processor Having Multiple Access Register", Ser. No. 09/044,088, filed Mar. 18, 1998, now U.S. Pat. No. 6,496,920;

"Memory Efficient Instruction Storage", Ser. No. 09/044,089, filed Mar. 18, 1998, now abandoned;

"Highly Parallel Variable Length Instructions for Controlling a Digital Signal Processor", Ser. No. 09/044,104, filed Mar. 18, 1998, now abandoned;

"Variable Length Instruction Decoder", Ser. No. 09/044,086, filed Mar. 18, 1998, now U.S. Pat. No. 6,425,070; and "Digital Signal Processor with Shiftable Multiply Accumulate Unit", Ser. No. 09/044,108, filed Mar. 18, 1998, now abandoned.

The disclosure of these applications is incorporated herein by reference.

In many signal processing algorithms, the computation $(B*C)+/-(D*E)$ is prominent, where B, C, D, and E are 16-bit integers. This computation is invoked when performing single-pole IIR filtering, computing magnitude of a complex quantity, dot-product or cross product of 2 vectors, and interpolation. It is also used in extended-precision operations (e.g. a 32×32 multiply). Since this operation is so ubiquitous, it is desirable to have a digital signal processor complete this operation in one cycle.

Although DSPs with two multiply-accumulate (MAC) units are available (e.g. Lucent DSP16000, TI C6x), they cannot compute the desired quantity in one cycle because their MAC units are separate. If we let R1, R2, R3, and R4 be general purpose 16-bit registers containing B, C, D, and E respectively, and let L1, L2, and L3 be 40-bit result registers, then a single invocation of the computation $$(B*C)+(D*E)$$

could be written in pseudocode on these existing processors as:

$$L1=R1*R2, L2=R3*R4; L3=L1+L2;$$

It should be noted that this computation takes 2 cycles on these processors.

FIG. 1 is a block diagram of a conventional MAC unit (100). A register file (102) has an input port PI1, and has three output ports, PO1, PO2, and PO3. The register file is connected to a memory (104). The output ports PO2 and PO3 are applied to a multiplier (106), which multiplies the signals together and applies them to one input of an adder (108). The adder receives its other input from PO1 of the register file. The sum is fed back to PI1 of the register file.

In the first clock cycle, nothing is applied to PO1, and R1 and R2 are applied to ports PO2 and PO3, respectively. The product, L1, is fed back to the register file and placed in a temporary register attached to PO1. In the second clock cycle, R3 and R4 are applied to ports PO2 and PO3, respectively, and emerge from the multiplier as L2. The adder combines L2 from the multiplier with L1 from PO1, produces L3, and feeds it back to the register bank via PI1. Once L3 is in the register bank, it can be made available to the memory.

40-bit adder, and a 17×17 bit multiplier, are shown. This is conventional, but any convenient number of bits may be used

BRIEF DISCLOSURE OF THE INVENTION

Two multiply-accumulate units are coupled together so that the computation $(B*C)+(D*E)$ can be completed in one cycle. An adder adds together the products of the two multipliers. The sum is applied to the first accumulator. Preferably, the second product is also applied to the second accumulator, and a multiplexer applies either a zero or the second product to the adder. If two unrelated computations are to be executed simultaneously, then the zero is applied, and the output of the second accumulator is fed back to the register file. If a single $(B*C)+(D*E)$ computation is to be executed, then the second product is applied to the adder, and the output of the second accumulator is disregarded.

DETAILED DESCRIPTION OF THE PREFERRED EMBODIMENTS

Figure 1:
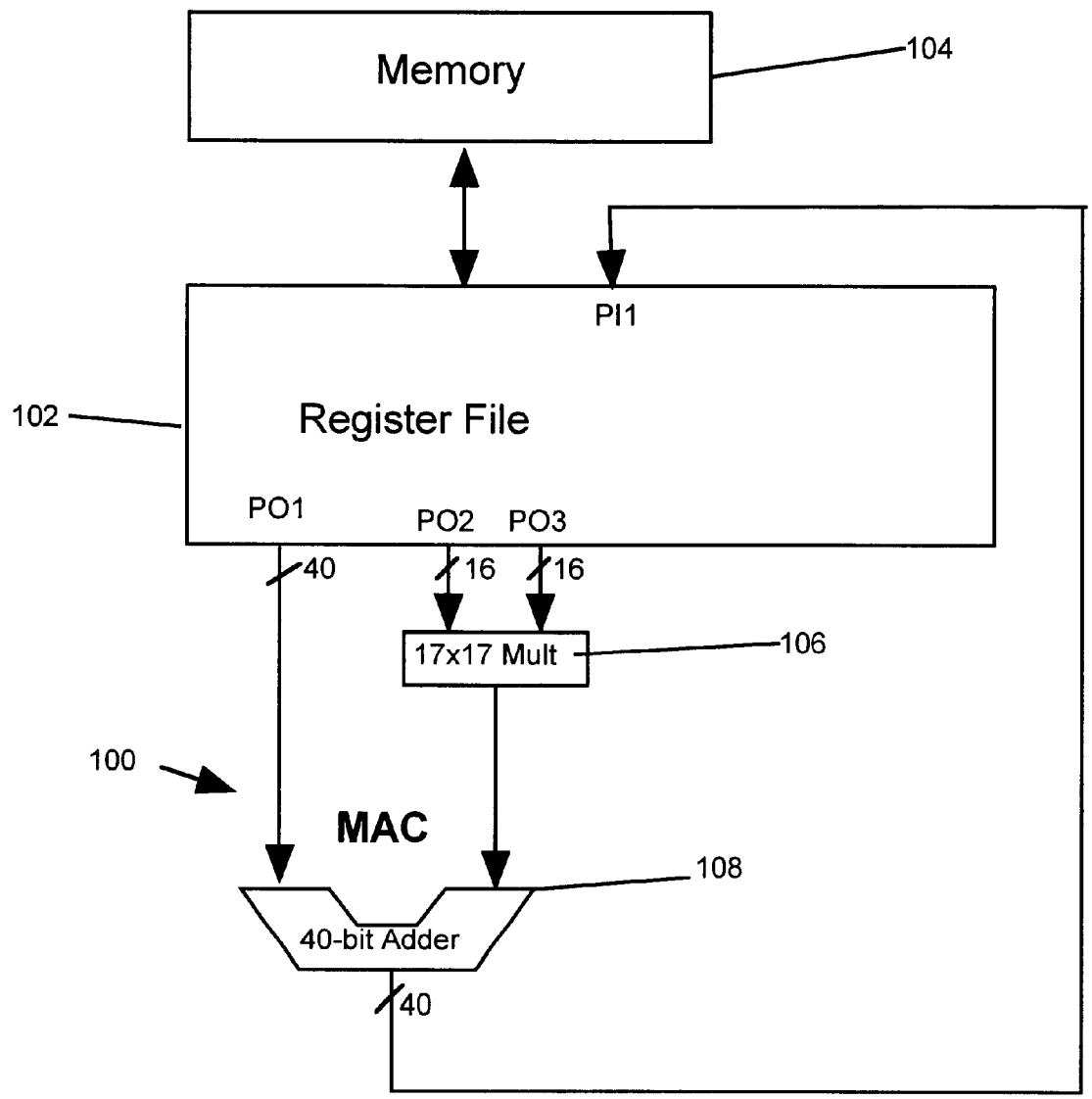
FIG. 1 is a block diagram of a conventional MAC unit.

FIG. 1 is a block diagram of a conventional MAC unit. It has been described in the "Background" section, and need not be further discussed.

Figure 2:
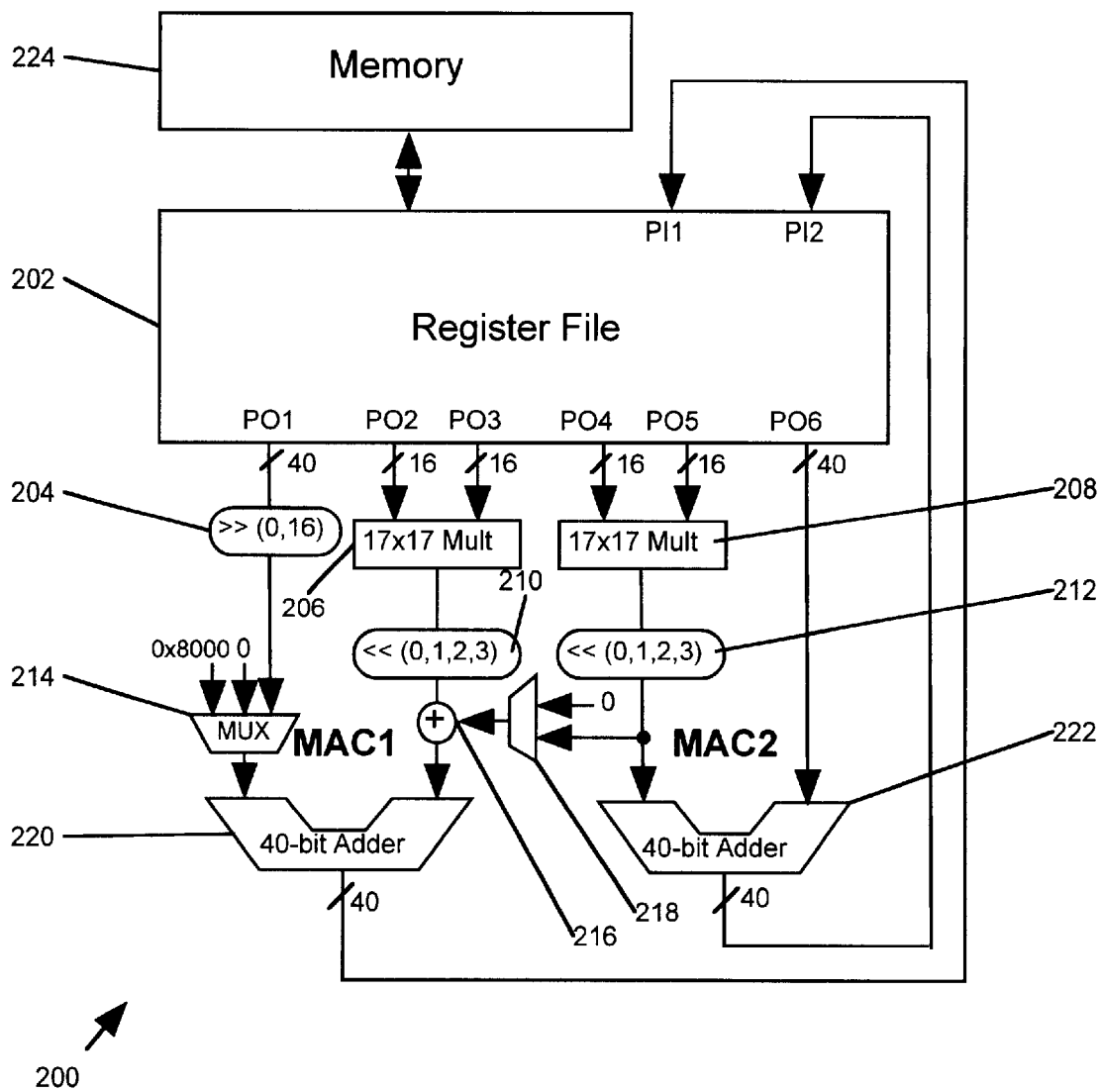
FIG. 2 is a block diagram of the present invention.

FIG. 2 is a block diagram of the present invention (200). A register file (202) has first and second inputs (PI1, PI2) and first through sixth outputs (PO1–PO6). Inputs and outputs are sometimes called input ports and output ports; the terms are used interchangeably herein. A first shifter (204) receives the first output of the register file, and a first multiplier (206) receives the second and third outputs of the register file. Likewise, a second multiplier (208) receives the fourth and fifth outputs of the register file. A second shifter (210) receives the output of the first multiplier, and a third shifter (212) receives the output of the second multiplier. A rounding multiplexer (214) receives the output of the first shifter.

A first adder (216) receives, at a first input, the output of the second shifter (210), and a multiplexer (218) receives either a zero or the output of the third shifter (212), and applies an output to a second input of the first adder (216).

A second adder (220) receives the outputs of the rounding multiplexer and the first adder. Its output is fed back to the first input (PI1) of the register file. A third adder (222) receives the outputs of the third shifter (212) and the sixth register output (PO6). Its output is fed back to the second input (PI2) of the register file.

The architecture shown in FIG. 2 has two MAC units (MAC1 and MAC2) that receive operands from a register file (202) containing a bank of general purpose registers. MAC1 fetches its multiplier operands from output ports PO2 and PO3 of the register file. The output of the multiplier (206) is passed to a shifter (210) that can shift the result left by 0, 1, 2, or 3 bits. The output of the shifter is passed to an adder (216) that can add zero or the result of the shifted product from MAC2. The output of the adder is passed into a 40-bit adder (220) that can add another 40-bit operand fetched from output port PO1 of the register file. The output of the 40-bit adder is stored into the register file via input port PI1. MAC2 fetches multiplier operands from output ports PO4 and PO5, multiplies them (208), shifts the result left by 0, 1, 2, or 3 bits (212), and passes the result to a 40-bit adder (222) that can add an additional register file operand fetched from output port PO6.

The output of the 40-bit adder is stored into the register file via register file input port PI2. A memory (224) can then extract these adder outputs from the appropriate registers of the register file (202). The memory (224), or some similar device, was what put the multiplicands and addends into the register file (202) in the first place.

As in the prior art, the facts that the adders are 40-bit devices, and that the multipliers multiply 16-bit multiplicands, are desirable but not necessary.

Notice that the shifted product from MAC2 is also fed into a multiplexer (218) which feeds the first adder (216) in MAC1. This multiplexer allows the user to set up the dual-MAC unit in one of two possible configurations.

Figure 3:
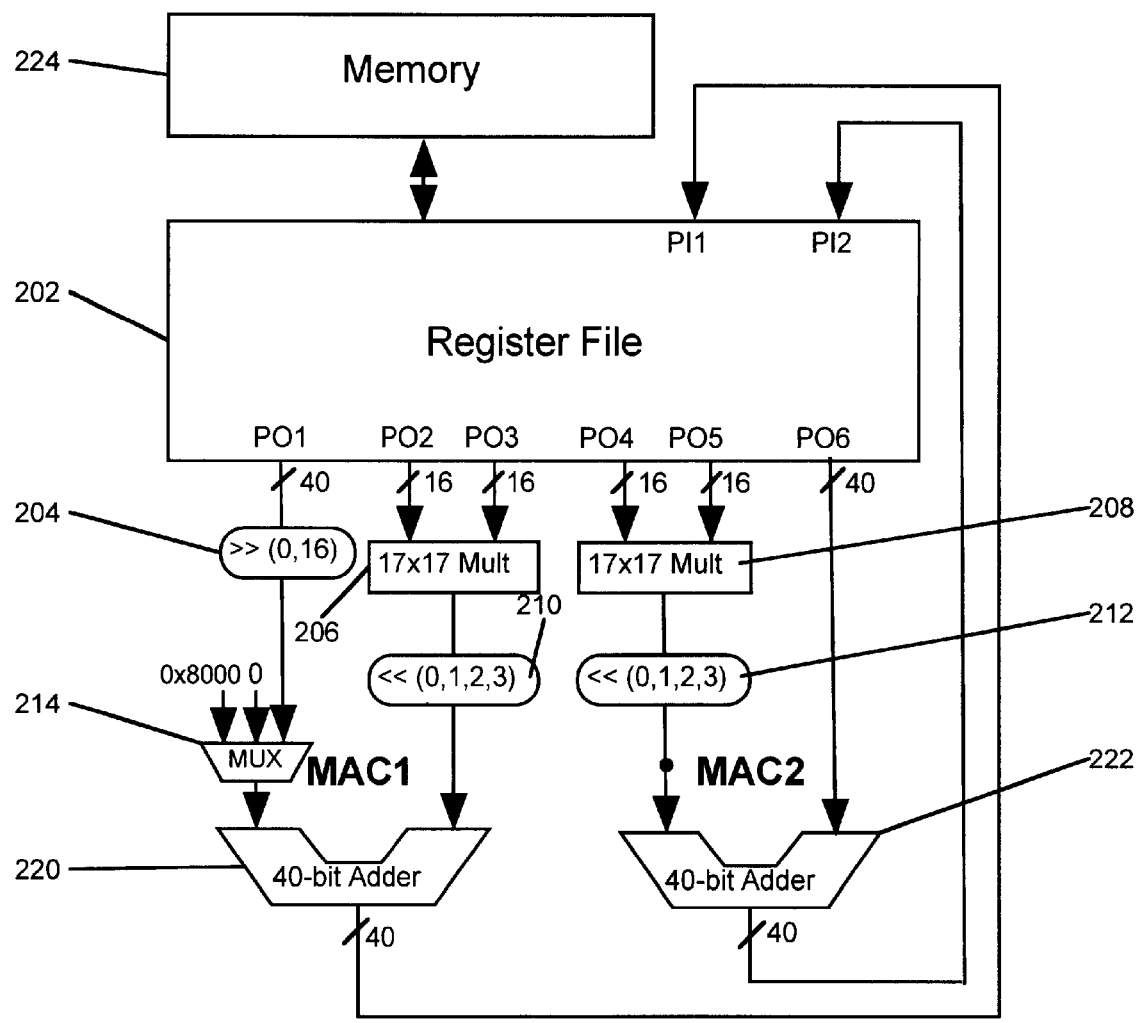
FIG. 3 shows the apparatus of FIG. 1 configured for independent MAC units.

FIG. 3 shows the apparatus of FIG. 2 configured for independent MAC units. When the user specifies (via an instruction) that the multiplexer (218) should take the zero as its input, the dual-MAC unit takes on this configuration. In this configuration, the two MAC units operate completely independently, which retains all the advantages of existing designs. This configuration is useful for executing two unrelated MAC computations simultaneously.

Figure 4:
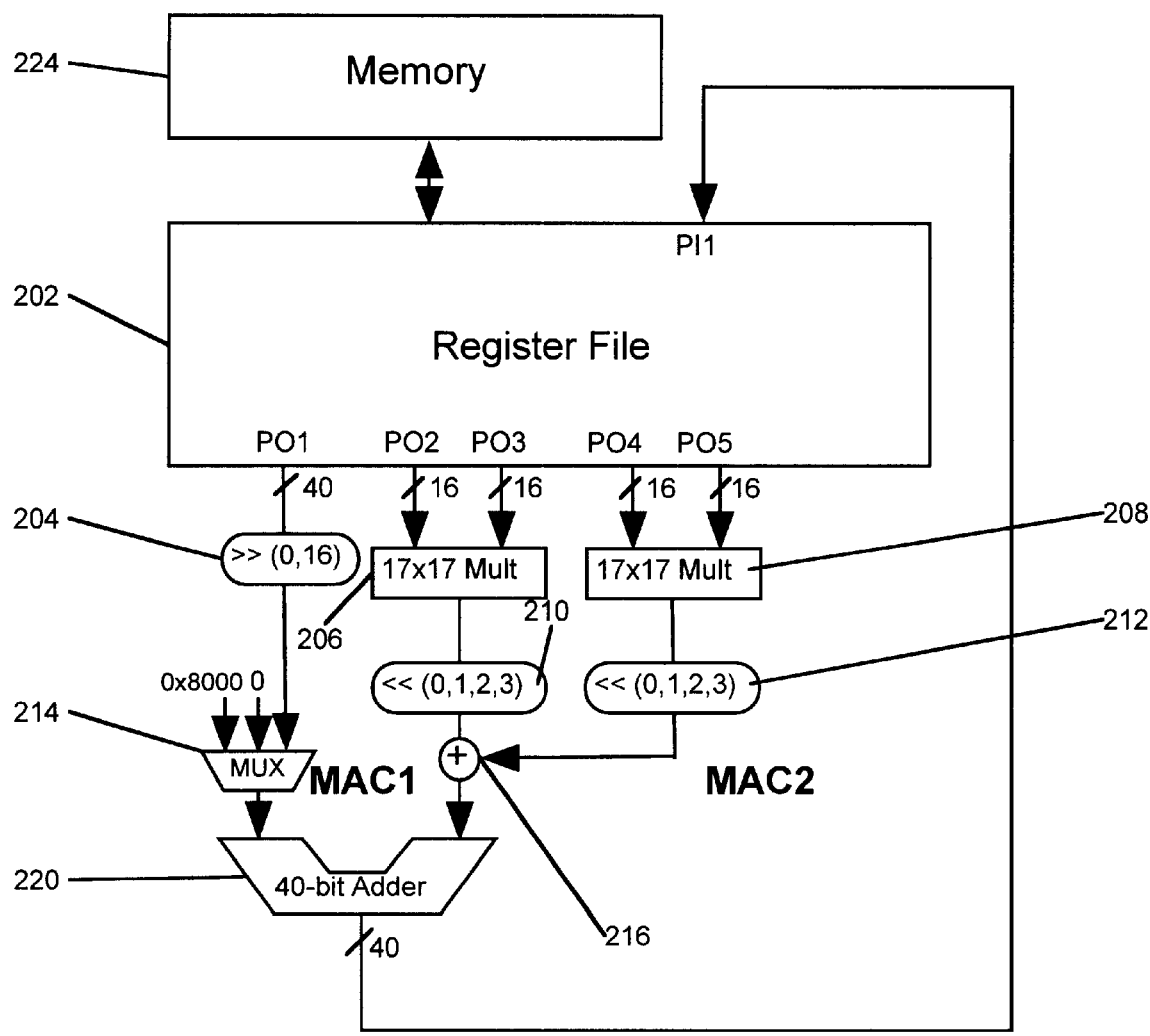
FIG. 4 shows the apparatus of FIG. 1 configured for coupled MAC units.

FIG. 4 shows the apparatus of FIG. 2 configured for coupled MAC units. When the aforementioned multiplexer (218) is set up to pass the multiplier result from MAC2 into the first adder (216) in MAC1, the dual-MAC unit takes on this configuration. In this configuration, the MAC units are coupled together and the output of the 40-bit adder (222) in MAC2 is disabled from writing to the register file. One can immediately see that this enables the dual-MAC unit to compute the quantity (B*C)+/-(D*E) in a single cycle by executing an instruction such as L1=R1*R2+/-R3*R4. Moreover, this configuration can also compute the quantity $$A+/-(B*C)+/-(D*E)$$

in a single cycle, where quantity A is fetched from the register file via output port PO1. This computation is extremely useful for complex multiply accumulate operations as well as extended precision operations.

The present invention, in its broadest embodiment, does not require all of the above components. Indeed, it is sufficient that the electronic circuit merely include a first (206) and a second multiplier (208) (each multiplier having at least two inputs and an output), an adder (216) having at least two inputs and an output, and a register file (202) including at least one input. The significant parts of the invention are that the output of each multiplier is connected to an input of the adder, and that the output of the adder is connected to an input of the register file. It is this feature which causes the multipliers, adder, and register file to operate, together, in a single clock cycle. Preferably the register file which receives the adders output is also the register file which outputs the multiplicands to the multipliers. Preferably the register file has six outputs rather than four, and preferably additional adders are provided to add numbers from these additional outputs to the products generated by the multipliers. Preferably shifters are provided to handle numbers of different orders of magnitude, and preferably a rounding multiplexer provides additional accuracy. These are all features of more detailed embodiments of the present invention, but are not necessary to the invention in its broadest embodiment.

Preferably, the adder is a first adder (216) and the electronic circuit further includes a second adder (220). In this embodiment, one input of the second adder is an output (PO1) of the register file, another input of the second adder (220) is the output of the first adder (216), and the output of the second adder (220) is an input (PI1) of the register file.

In another embodiment, the electronic circuit further includes a third adder (222) in addition to the second adder (220). In this embodiment, one input of the third adder is another output (PO6) of the register file, and another input of third adder is the output of the second multiplier (208).

Figure 5:
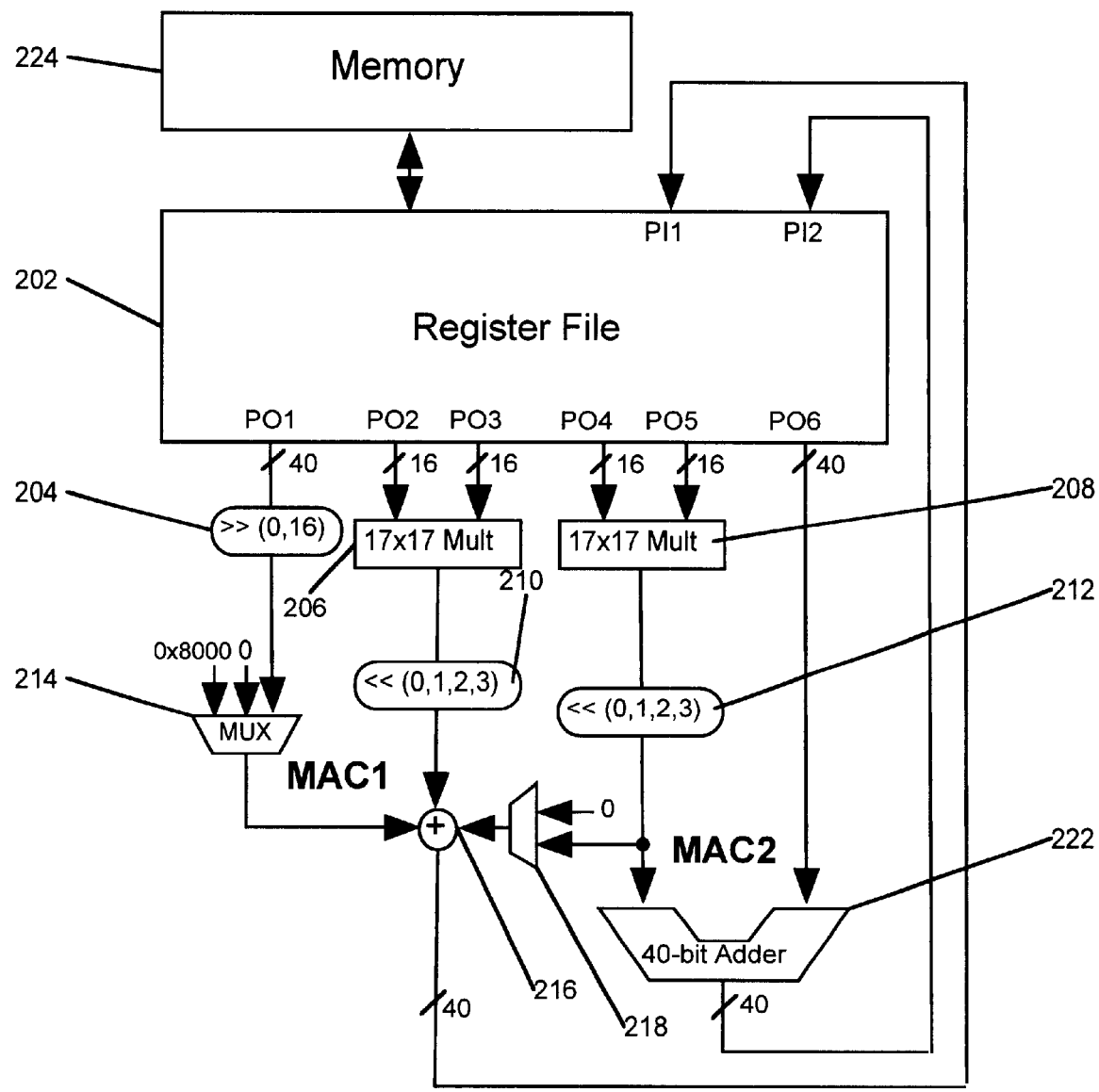
FIG. 5 shows an alternative adder structure of the apparatus shown in FIG. 2.

FIG. 5 shows an alternative adder structure of the apparatus shown in FIG. 2. In this embodiment, the second adder (220) is omitted. In this embodiment, the first adder (216) has a third input, which is connected to an output (PO1) of the register file.

In another embodiment, the electronic circuit further includes an externally-controlled multiplexer (218). One input of the multiplexer is the output of the second multiplier (208), the other input of the multiplexer is zero, and the output of the multiplexer is an input to the adder (216).

In another embodiment, a shifter (210), (212) is inserted between the output of each multiplier (206), (208) and the inputs of the adder (216).

Industrial Application

This invention is capable of exploitation in industry, and can be made and used, whenever is it desired to perform multiple multiply-accumulate executions in a single cycle. The individual components of the apparatus and method shown herein, taken separate and apart from one another, may be entirely conventional, it being their combination that is claimed as the invention.

While various modes of apparatus and method have been described, the true spirit and scope of the invention are not limited thereto, but are limited only by the following claims and their equivalents, and such are claimed as the invention.

What is claimed is:

1. An electronic circuit, characterized in that it includes:
   (a) a register file having first and second inputs and first through sixth outputs;
   (b) a first shifter receiving the first output of the register file;

(c) a first multiplier receiving the second and third outputs of the register file and having an output;

(d) a second multiplier receiving the fourth and fifth outputs of the register file and having an output;

(e) a second shifter receiving the output of the first multiplier and having an output;

(f) a third shifter receiving the output of the second multiplier and having an output;

(g) a rounding multiplexer receiving the output of the first shifter and having an output;

(h) a first adder receiving, at a first input, the output of the second shifter and having an output;

(i) a multiplexer receiving either a zero or the output of the third shifter, and applying an output to a second input of the first adder;

(j) a second adder receiving the outputs of the rounding multiplexer and the first adder, and having an output which is fed back to the first input of the register file; and (k) a third adder receiving the outputs of the third shifter and the sixth register output, and having an output which is fed back to the second input of the register file.

* * * * *